(12) United States Patent
Ishigami

(10) Patent No.: US 11,491,995 B2
(45) Date of Patent: Nov. 8, 2022

(54) ARITHMETIC MODEL GENERATION SYSTEM AND ARITHMETIC MODEL GENERATION METHOD

(71) Applicant: TOYO TIRE CORPORATION, Itami (JP)

(72) Inventor: Naohiro Ishigami, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 145 days.

(21) Appl. No.: 16/728,690

(22) Filed: Dec. 27, 2019

(65) Prior Publication Data
US 2020/0207361 A1 Jul. 2, 2020

(30) Foreign Application Priority Data
Dec. 28, 2018 (JP) .............................. JP2018-247460

(51) Int. Cl.
*B60W 40/13* (2012.01)
*B60W 50/00* (2006.01)
*B60W 40/068* (2012.01)

(52) U.S. Cl.
CPC .......... *B60W 40/13* (2013.01); *B60W 40/068* (2013.01); *B60W 50/00* (2013.01);
(Continued)

(58) Field of Classification Search
CPC .... B60W 40/13; B60W 40/068; B60W 50/00; B60W 2552/40; B60W 2040/1307;
(Continued)

(56) References Cited

U.S. PATENT DOCUMENTS 9,434,387 B2 * 9/2016 Hanatsuka .............. B60C 99/00
10,661,785 B2 * 5/2020 Dhaens ............... B60W 10/184
(Continued)

FOREIGN PATENT DOCUMENTS

EP 2774784 A1 9/2014
EP 2777956 A2 9/2014
(Continued)

OTHER PUBLICATIONS

David Kher, "A PCA-based Modeling Approach for Estimation of Road-tire Forces by In-tire Accelerometers", Aug. 29, 2014, The International Federation of Automatic Control, 19th World Congress (Year: 2014).*
(Continued)

*Primary Examiner* — Russell Frejd
*Assistant Examiner* — Matthias S Weisfeld
(74) *Attorney, Agent, or Firm* — Muncy, Geissler, Olds & Lowe, P.C.

(57) ABSTRACT

An arithmetic model generation system includes a sensor information acquisition unit, a tire force calculator, and an arithmetic model update unit. The sensor information acquisition unit acquires acceleration of a tire. The tire force calculator includes an arithmetic model for calculating tire force F based on the acceleration, and calculates the tire force F by inputting the acceleration acquired by the sensor information acquisition unit. The arithmetic model update unit compares tire axial force measured by the tire and the tire force F calculated by the tire force calculator, and updates the arithmetic model.

3 Claims, 10 Drawing Sheets

(52) U.S. Cl.
CPC .............. *B60W 2040/1307* (2013.01); *B60W 2050/0037* (2013.01); *B60W 2520/26* (2013.01); *B60W 2520/30* (2013.01); *B60W 2530/20* (2013.01); *B60W 2552/40* (2020.02)

(58) Field of Classification Search
CPC ..... B60W 2050/0037; B60W 2520/26; B60W 2520/30; B60W 2530/20
USPC .......................................................... 701/32.9
See application file for complete search history.

(56) References Cited

U.S. PATENT DOCUMENTS

| | | | |
|---|---|---|---|
| 2003/0006890 A1* | 1/2003 | Magiawala | B60C 23/061 340/442 |
| 2003/0006893 A1* | 1/2003 | Dunbridge | G01M 17/04 340/444 |
| 2014/0257629 A1* | 9/2014 | Singh | B60T 8/1725 701/34.4 |
| 2014/0260585 A1* | 9/2014 | Singh | G01M 17/02 73/146 |
| 2017/0080908 A1* | 3/2017 | Morgan | B60T 8/171 |

FOREIGN PATENT DOCUMENTS

| | | | |
|---|---|---|---|
| JP | 200559800 | 3/2005 | |
| JP | 2014035279 A | 2/2014 | |
| WO | WO-2016056568 A1 * | 4/2016 | ............ B60C 19/00 |

OTHER PUBLICATIONS

Arto Niskanen, "Three Three-Axis IEPE Accelerometers on the Inner Liner of a Tire for Finding the Tire-Road Friction Potential Indicators", Sep. 26, 2014, 12th International Symposium on Advanced Vehicle Control (Year: 2014).*
Extended European Search Report dated May 13, 2020 in EP Appiication No. 19217320.1.

* cited by examiner

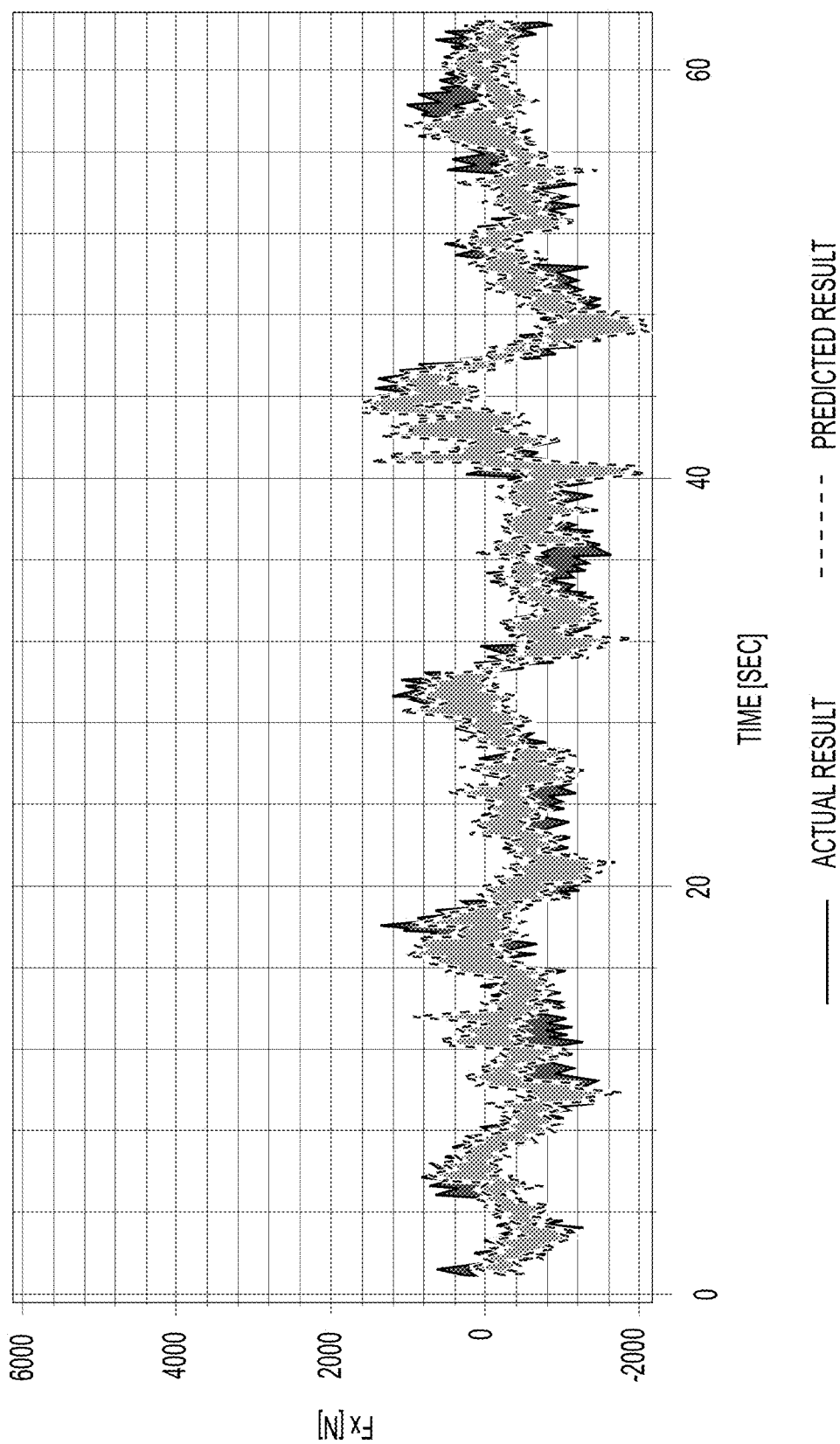

ARITHMETIC MODEL GENERATION SYSTEM AND ARITHMETIC MODEL GENERATION METHOD

CROSS-REFERENCE TO RELATED APPLICATION

This application is based upon and claims the benefit of priority from the prior Japanese Patent Application No. 2018-247460, filed on Dec. 28, 2018, the entire contents of which are incorporated herein by reference.

BACKGROUND OF THE INVENTION

1. Field of the Invention

The present invention relates to an arithmetic model generation system and an arithmetic model generation method.

2. Description of the Related Art

In general, as a method for estimating a friction coefficient between a tire and a road surface, a method using vehicle information such as vehicle acceleration and engine torque is known. When the vehicle information is used, behavior of the tire in an actual running state such as vibration generated in the vicinity of each tire is not reflected, and calculation accuracy of tire force calculated in estimating the friction coefficient is considered to be low.

Japanese Unexamined Patent Publication No. 2014-035279 describes a conventional road surface state discrimination method. In this road surface state discrimination method, windowing means windows a time-series waveform of tire vibrations detected by an acceleration sensor attached to a tire, a time-series waveform of tire vibrations for each time window is extracted, and a feature vector for each time window is calculated. A kernel function is calculated from the calculated feature vector for each time window and a road surface feature vector that is a feature vector for each time window calculated from a time-series waveform of tire vibrations obtained for each road surface state calculated in advance. In the road surface state discrimination method, a road surface state is discriminated by comparing values of discriminant functions using the kernel function.

SUMMARY OF THE INVENTION

The road surface state discrimination method described in Japanese Unexamined Patent Publication No. 2014-035279 discriminates whether the road surface is in a DRY, WET, SNOW, or ICE state based on features of the tire vibrations detected by the acceleration sensor attached to the tire. The present inventor has noticed that the road surface state discrimination method described in Japanese Unexamined Patent Publication No. 2014-035279 only discriminates the four road surface states of DRY, WET, SNOW, and ICE, and that there is room for improvement in estimating a friction coefficient between the tire and the road surface, etc.

In other words, in order to increase calculation accuracy of tire force in estimating the friction coefficient between the tire and the road surface, etc., it is necessary to consider a tire force calculation method that reflects behavior of the tire.

The present invention has been made in view of such circumstances, and an object thereof is to provide an arithmetic model generation system and an arithmetic model generation method capable of generating an arithmetic model for accurately estimating tire force.

One embodiment of the present invention is an arithmetic model generation system. The arithmetic model generation system includes: an information acquisition unit structured to acquire acceleration of a tire; a tire force calculator including an arithmetic model structured to calculate tire force based on the acceleration, and the tire force calculator structured to calculate the tire force using the arithmetic model by inputting the acceleration acquired by the information acquisition unit; and an arithmetic model update unit structured to compare tire axial force measured by the tire and the tire force calculated by the tire force calculator and update the arithmetic model.

Another embodiment of the present invention is an arithmetic model generation method. The arithmetic model generation method includes: an information acquisition step of acquiring acceleration of a tire; a tire force calculation step of calculating tire force, based on an arithmetic model structured to calculate the tire force based on the acceleration, using the arithmetic model by inputting the acceleration acquired in the information acquisition step; and an arithmetic model update step of comparing tire axial force measured by the tire and the tire force calculated in the tire force calculation step and updating the arithmetic model.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIGS. 6A, 6B and 6C are graphs each showing estimated tire force F and measured tire axial force when the acceleration sensor is disposed on a tread.

DETAILED DESCRIPTION OF THE INVENTION

Figure 1:
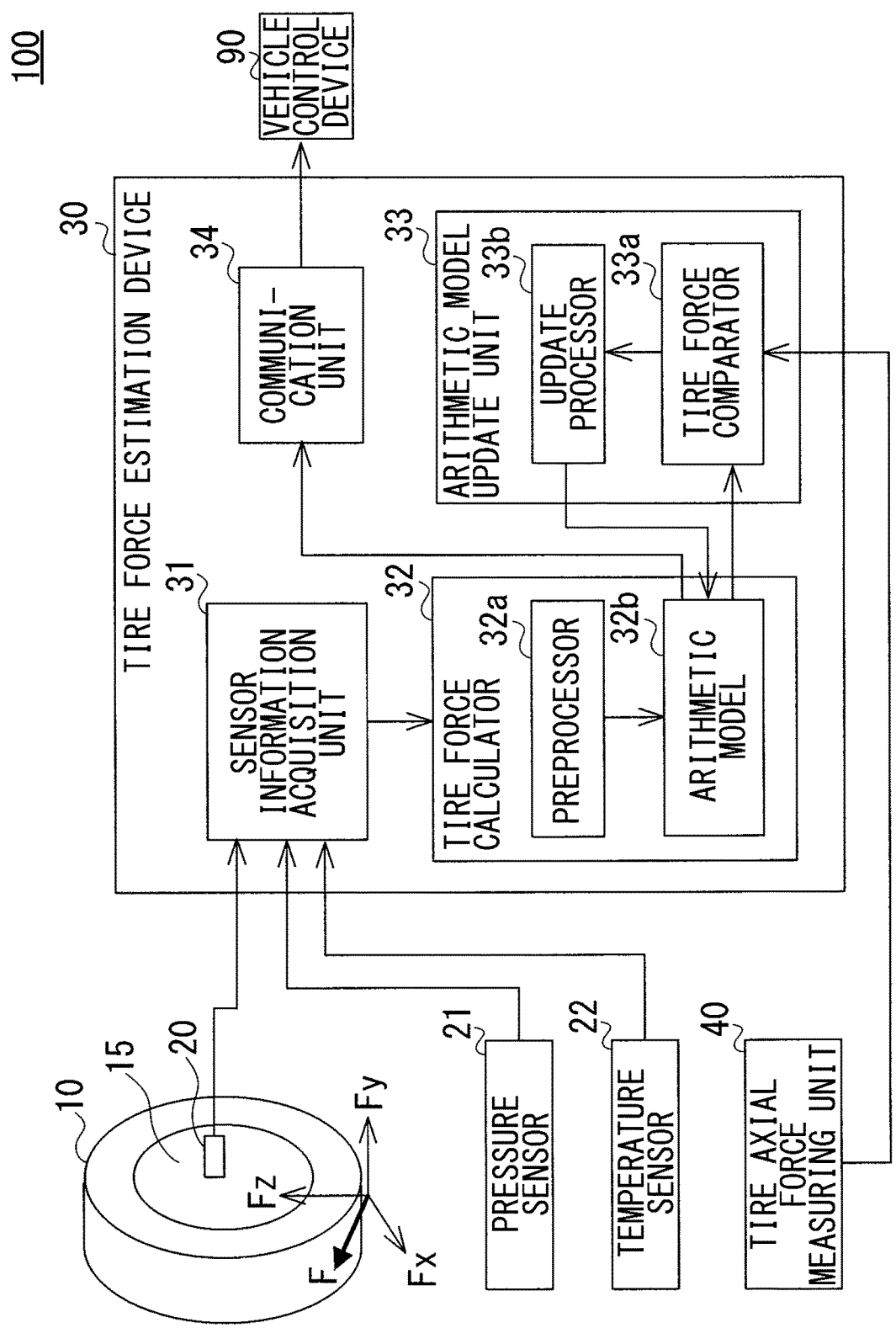
FIG. 1 is a block diagram showing a functional configuration of an arithmetic model generation system according to an embodiment.

The invention will now be described by reference to the preferred embodiments. This does not intend to limit the scope of the present invention, but to exemplify the invention.

Hereinafter, the present invention will be described based on the preferred embodiments with reference to FIGS. 1 to 6. The same or equivalent constituent elements and members shown in the drawings are denoted by the same reference numerals, and repeated descriptions are appropriately omitted. In addition, dimensions of the members in the drawings are appropriately enlarged or reduced for easy understanding. Also, in the drawings, some of the members that are not important for describing the embodiments are omitted.

Embodiment

FIG. 1 is a block diagram illustrating a functional configuration of an arithmetic model generation system 100 according to an embodiment. In the arithmetic model generation system 100, acceleration measured by an acceleration sensor 20 disposed on a tire 10 is input to an arithmetic model for calculating tire force F in a tire force estimation device 30, and the tire force F is calculated as an output of the arithmetic model. The arithmetic model generation system 100 increases accuracy of the arithmetic model by using a learning type model such as a neural network as the arithmetic model, measuring tire axial force acting on the tire 10 as teacher data, and repeating learning by executing calculation and updating the arithmetic model. The arithmetic model generation system 100 can also function as a tire force estimation system that estimates tire force after the arithmetic model is learned.

For a tire 10 having certain specifications, the arithmetic model generation system 100 can perform learning of the arithmetic model in a rotation test on the tire 10 (including a wheel), and can perform learning of the arithmetic model when the tire 10 is attached to an actual vehicle and the vehicle travels. The tire specifications include, for example, information on tire performance such as a manufacturer, a product name, a tire size, a tire width, flatness, a tire strength, a tire outer diameter, a road index, and a date of manufacture.

A case will be described in which the arithmetic model generation system 100 is caused to function as the tire force estimation system after the arithmetic model is learned. As the tire force estimation system, the arithmetic model generation system 100 is used, for example, for estimating a friction coefficient between a tire and a road surface based on the estimated tire force F. The arithmetic model generation system 100 also provides the estimated tire force F for a vehicle control device 90 and the like mounted on the vehicle, and the vehicle control device 90 and the like notifies information on skidding, a braking distance, etc. to a vehicle driver and the like. Further, when the vehicle control device 90 has a function of automatically driving a vehicle, the arithmetic model generation system 100 provides the estimated tire force F for the vehicle control device 90 as data used for vehicle speed control or the like in automatic driving.

The arithmetic model generation system 100 may construct an arithmetic model to which measurement data, such as tire temperature and tire pressure, is input in addition to the acceleration. In addition, the arithmetic model may take the form of acceleration in a radial direction of the tire 10 as an input and a vertical component of the tire force F as an output, or may take the form of triaxial acceleration in the radial direction, an axial direction, and a longitudinal direction of the tire 10 as inputs and triaxial components of the tire force F as outputs. Further, for example, the arithmetic model may take the form of biaxial acceleration in the radial direction and the axial direction of the tire 10 as inputs and biaxial components in the vertical direction and a lateral direction of the tire force F as outputs. The arithmetic model may take the form of biaxial acceleration by an arbitrary combination as inputs and corresponding biaxial components of the tire force F as outputs.

Figure 2:
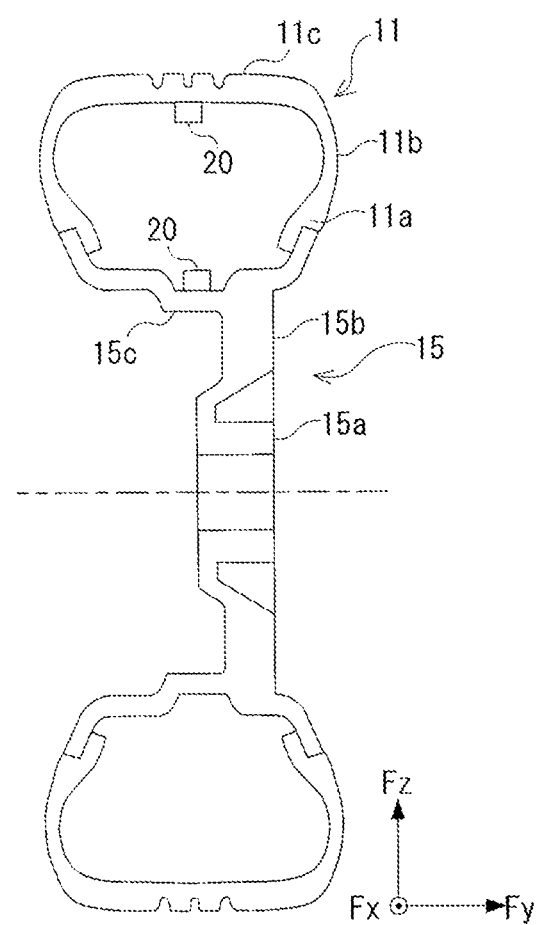
FIG. 2 is a cross-sectional view including a rotation axis of a tire.

FIG. 2 is a cross-sectional view including a rotation axis of the tire 10. A wheel 15 is fitted in the center of the tire 10. In the wheel 15, a disk 15b extends radially around a hub 15a connecting axles and supports a rim 15c having a cylindrical shape. A bead 11a of a tire body 11 is fitted into the rim 15c. The acceleration sensor 20 can be disposed in the tire 10 at an arbitrary position where there is no mechanical interference with a vehicle-side component or the like. FIG. 2 shows an example in which the acceleration sensor 20 is disposed on the rim 15c and an example in which the acceleration sensor 20 is disposed on a tread 11c of the tire body 11. In addition to these examples, the acceleration sensor 20 may be disposed on the hub 15a, the disk 15b, the bead 11a, a side 11b, and the like. Note that, as shown in FIG. 2, the tire force F has components of longitudinal force Fx in the longitudinal direction of the tire 10, lateral force Fy in the lateral direction, and a load Fz in the vertical direction.

Figure 3A:
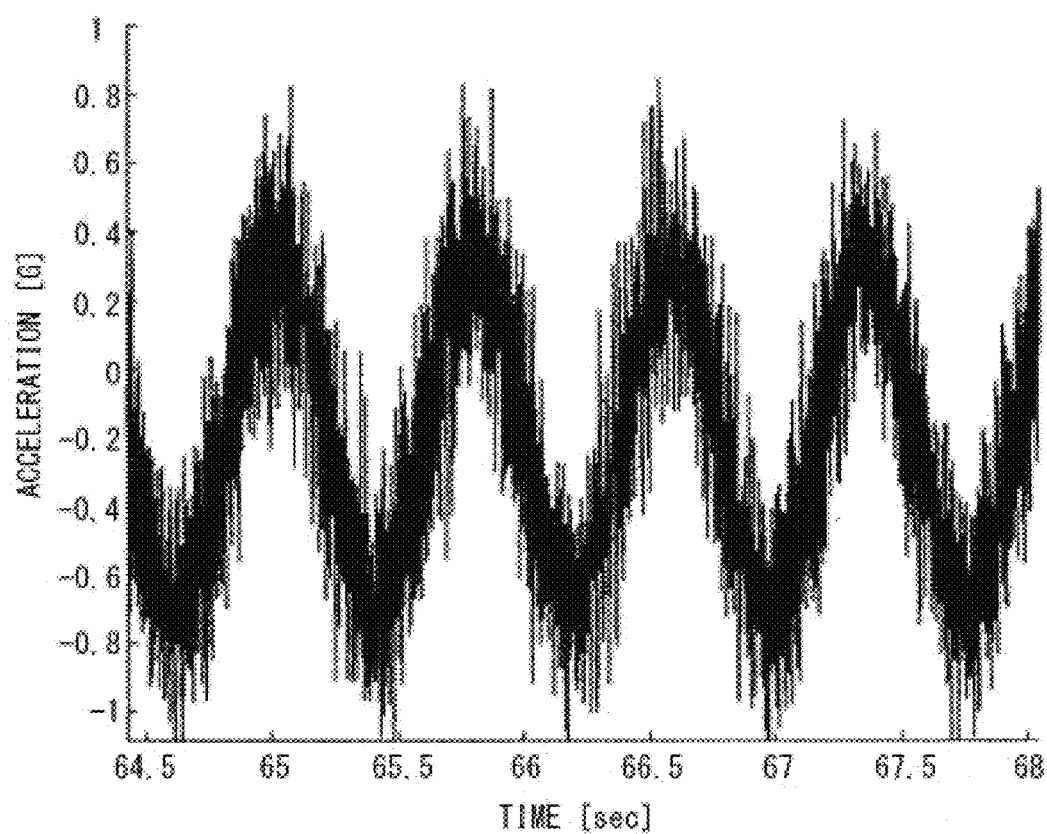
FIGS. 3A and 3B are graphs for explaining a difference in measurement data during rotation of the tire depending on a position of an acceleration sensor.
Figure 3B:
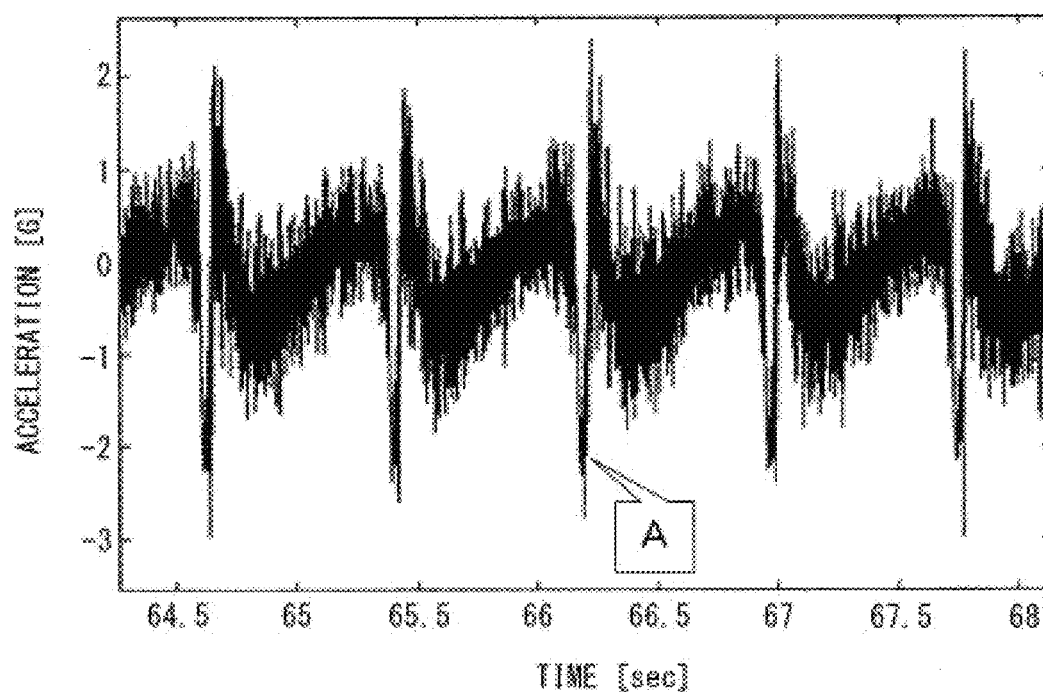

FIGS. 3A and 3B are graphs for explaining a difference in measurement data during rotation of the tire 10 depending on a position of the acceleration sensor. FIG. 3A shows radial acceleration when the acceleration sensor 20 is disposed on the rim 15c, and FIG. 3B shows radial acceleration when the acceleration sensor 20 is disposed on the tread 11c of the tire body 11. In FIGS. 3A and 3B, a horizontal axis represents time, and a vertical axis represents the acceleration. When the tire 10 rotates, the acceleration sensor 20 measures acceleration generated in a state in which an outer peripheral surface of the tire 10 is in contact with the road surface (hereinafter referred to as a road surface contact state) and acceleration generated in a state in which the outer peripheral surface is not in contact with the road surface (hereinafter referred to as a road surface non-contact state). As shown in FIG. 3B, when the acceleration sensor 20 is disposed on the tread 11c, the acceleration sensor 20 measures acceleration that extends in a negative direction (a point A shown in FIG. 3B). The acceleration sensor 20 disposed on the tread 11c measures an acceleration waveform such as the point A for a short time when it reaches a position of the road surface contact state, and there is a need to increase a sampling frequency so as not to miss this waveform. On the other hand, as shown in FIG. 3A, when the acceleration sensor 20 is disposed on the rim 15c, local waveform data such as the point A in FIG. 3B is not recognized in acceleration measurement data, and a sampling frequency can be made lower than when the acceleration sensor 20 is disposed on the tread 11c.

Returning to FIG. 1, the tire 10 is provided with a pressure sensor 21 and a temperature sensor 22. The pressure sensor 21 and the temperature sensor 22 are disposed, for example, on an air valve of the tire 10, and measure tire air pressure and temperature of the tire 10, respectively. The temperature sensor 22 may be disposed on the bead 11a, the side 11b, the tread 11c, and the like of the tire 10 in order to accurately measure the temperature of the tire 10. Note that the tire 10 may be attached with, for example, an RFID to which unique identification information is assigned in order to identify each tire.

The tire force estimation device 30 includes a sensor information acquisition unit 31, a tire force calculator 32, an arithmetic model update unit 33, and a communication unit 34. The tire force estimation device 30 is an information processing device such as a PC (personal computer). The units in the tire force estimation device 30 can be realized in hardware by an electronic element such as a CPU of a computer or a machine part, and in software by a computer program and the like. Here, functional blocks realized through collaboration among them are described. Accordingly, those skilled in the art will understand that these functional blocks can be realized in various forms by a combination of hardware and software.

The sensor information acquisition unit 31 acquires information on acceleration, air pressure, and temperature measured by the tire 10 from the acceleration sensor 20, the pressure sensor 21, and the temperature sensor 22 by wireless communication or the like. The communication unit 34 communicates with an external device such as the vehicle control device 90 by wired or wireless communication, etc., and transmits the tire force F estimated for the tire 10 to the external device via a communication line, for example, CAN (control area network). The external device may be a server that collects information about the tire 10 through the communication line.

The tire force calculator 32 includes a preprocessor 32a and an arithmetic model 32b. The preprocessor 32a performs resampling processing and filtering processing on acceleration data acquired by the sensor information acquisition unit 31. Further, the preprocessor 32a may obtain a period in the road surface contact state in the acceleration data and cut out acceleration data in the road surface contact state by window processing.

As the arithmetic model 32b, for example, a learning type model such as a neural network is used. The arithmetic model 32b inputs the acceleration data, the tire pressure, and the tire temperature to a node of an input layer, and executes calculation using a path provided with a weight from the input layer to an intermediate layer. The arithmetic model 32b further performs calculation using a path provided with a weight from the intermediate layer to an output layer, and outputs the tire force F from a node of the output layer. In the learning type model such as a neural network, a non-linear operation may be executed using an activation function in addition to a linear operation.

The arithmetic model update unit 33 includes a tire force comparator 33a and an update processor 33b. The tire force comparator 33a compares the tire force F calculated by the arithmetic model 32b with tire axial force as teacher data measured by a tire axial force measuring unit 40, and outputs an error to the update processor 33b.

The update processor 33b updates a path weight on the arithmetic model based on the error of the tire force F calculated by the arithmetic model 32b. By repeating the calculation of the tire force F by the arithmetic model 32b, the comparison with the teacher data by the tire force comparator 33a, and the update of the arithmetic model by the update processor 33b, accuracy of the arithmetic model is improved.

Figure 4:
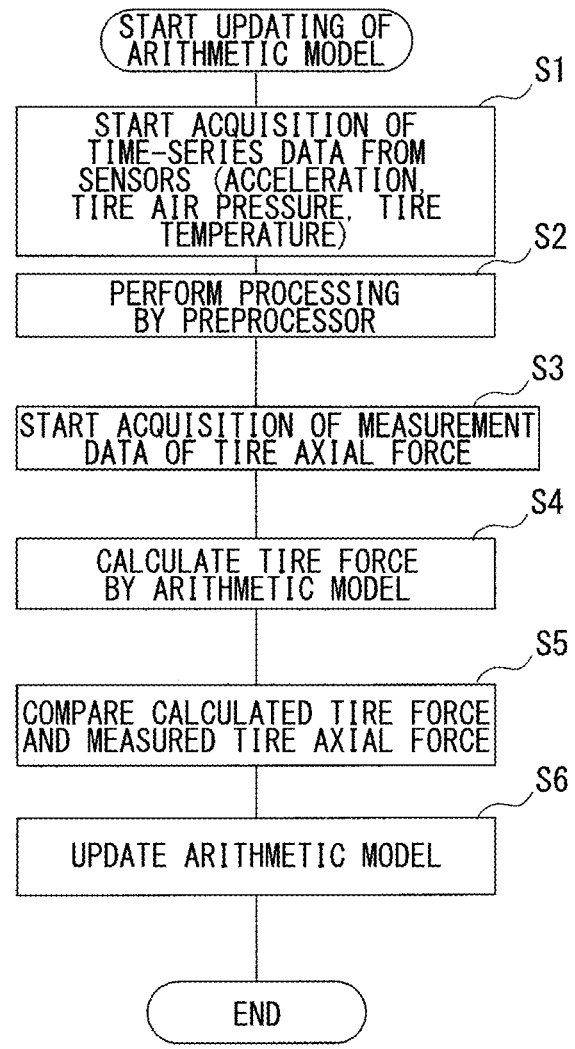
FIG. 4 is a flowchart showing a procedure for updating an arithmetic model by a tire force estimation device.

Next, operation of the arithmetic model generation system 100 will be described. FIG. 4 is a flowchart showing a procedure for updating the arithmetic model by the tire force estimation device 30. In the tire force estimation device 30, the sensor information acquisition unit 31 starts acquisition of time-series data of acceleration, air pressure, and temperature measured by the tire 10 from the acceleration sensor 20, the pressure sensor 21, and the temperature sensor 22 (S1). Further, the preprocessor 32a performs resampling processing, filtering processing, and the like on the acquired time-series data from the sensors (S2). In parallel with these, the arithmetic model update unit 33 starts acquisition of measurement data of tire axial force from the tire axial force measuring unit 40 (S3).

Using the time-series data processed by the preprocessor 32a as an input, tire force is calculated by the arithmetic model 32b (S4). The tire force comparator 33a compares the tire force F calculated by the arithmetic model 32b and the tire axial force as teacher data measured by the tire axial force measuring unit 40 (S5). The tire force comparator 33a outputs an error between the tire force F calculated by the arithmetic model 32b and the tire axial force measured by the tire axial force measuring unit 40 as a comparison result to the update processor 33b.

The update processor 33b updates the arithmetic model based on the error of the tire force F input from the tire force comparator 33a (S6), and then the processing ends. The tire force estimation device 30 repeats these processing, thereby updating the arithmetic model and improving estimation accuracy of the tire force.

Figure 5A:
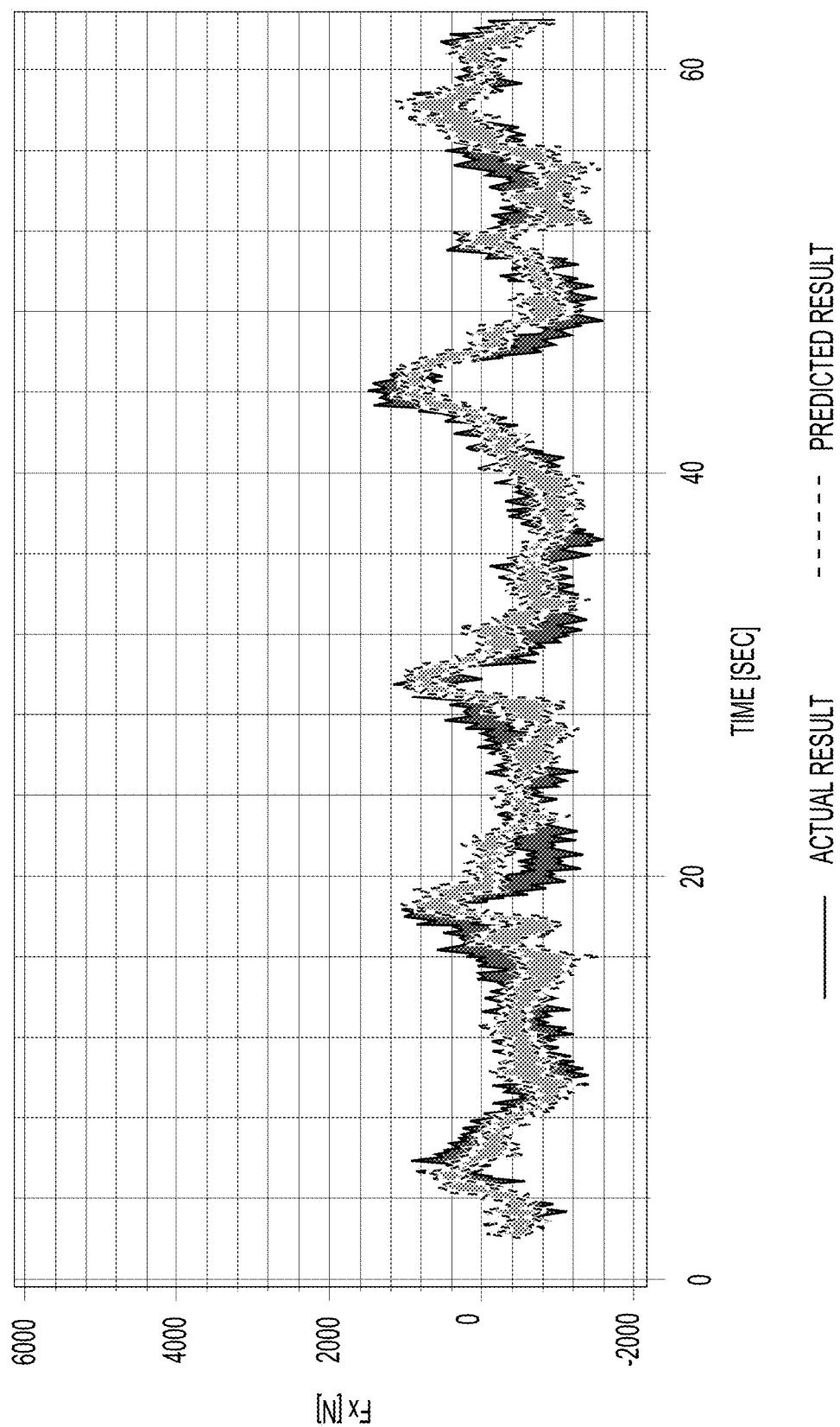
FIGS. 5A, 5B and 5C are graphs each showing estimated tire force F and measured tire axial force when the acceleration sensor is disposed on a rim.
Figure 5B:
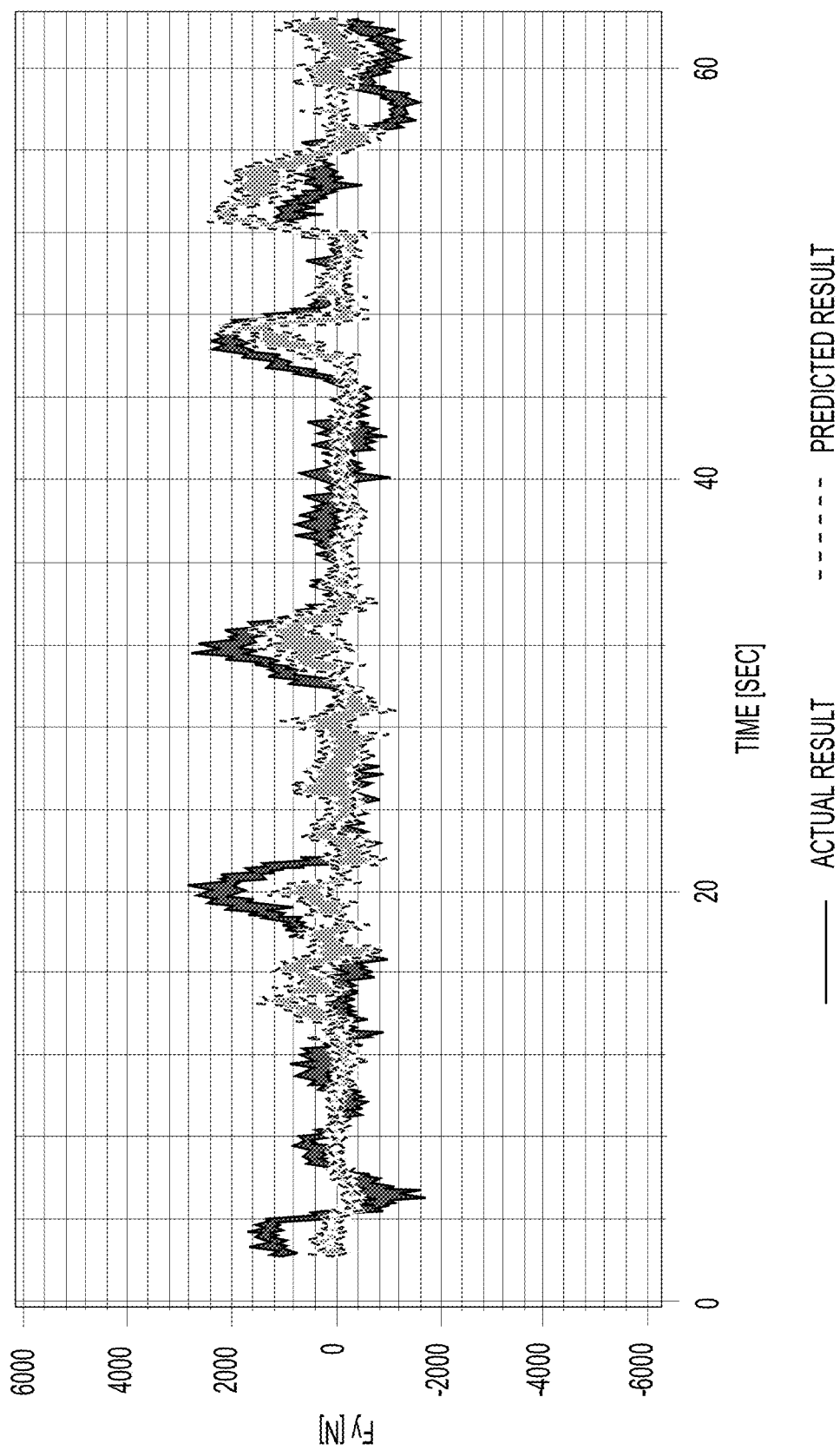
Figure 5C:
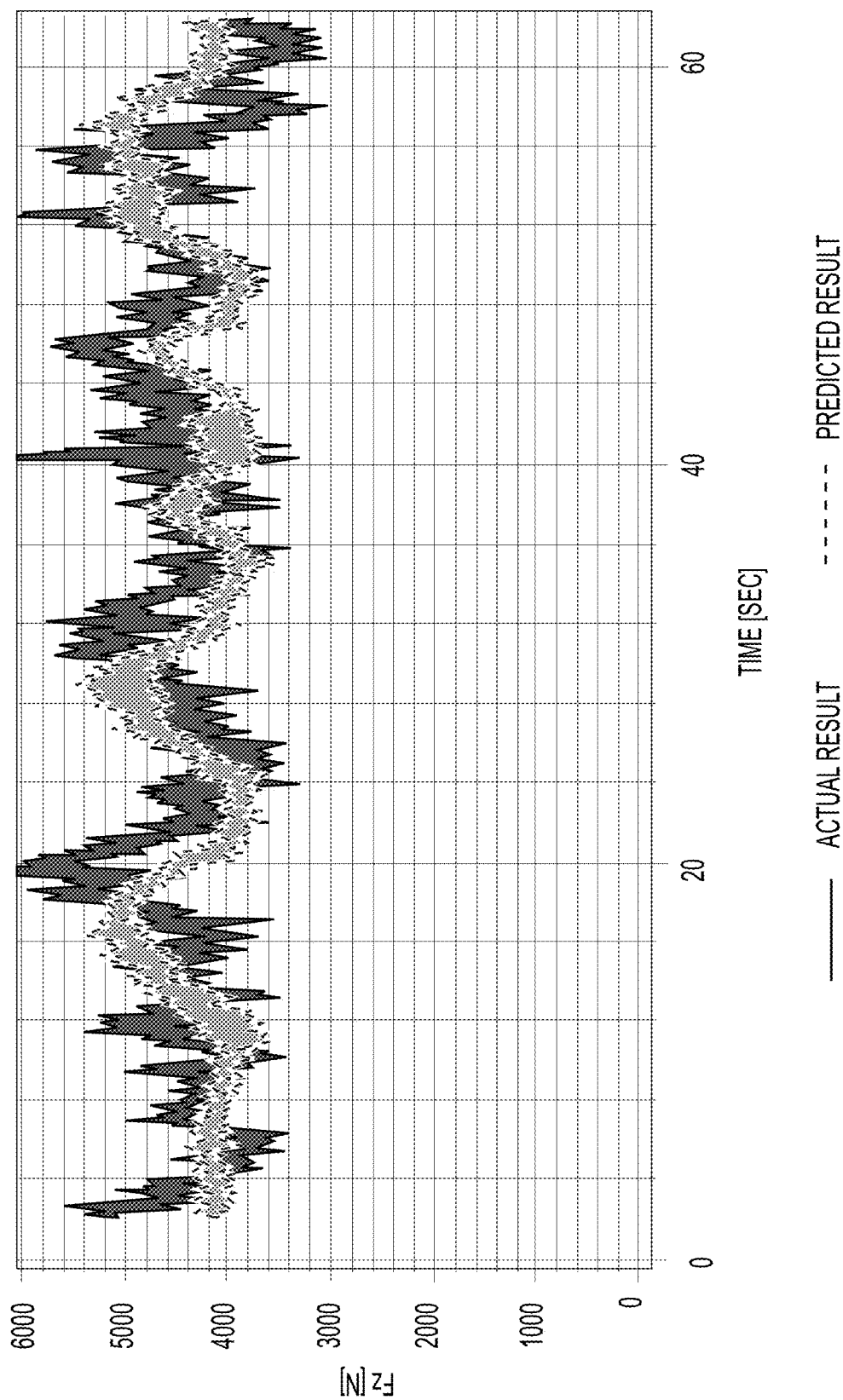

FIGS. 5A to 5C are graphs each showing estimated tire force F and measured tire axial force when the acceleration sensor 20 is disposed on the rim 15c. FIG. 5A is a graph showing longitudinal force Fx, FIG. 5B is a graph showing lateral force Fy, and FIG. 5C is a graph showing a load Fz. In FIGS. 5A to 5C, a horizontal axis represents time, and a vertical axis represents force. In this example in which the acceleration sensor 20 is disposed on the rim 15c, a sampling frequency is 100 Hz. In FIGS. 5A to 5C, "actual result" represents actual tire axial force (teacher data), and "predicted value" represents estimated tire force.

Looking at the longitudinal force Fx shown in FIG. 5A and the lateral force Fy shown in FIG. 5B, the estimated tire force F can obtain a rise of each force at approximately the same timing as the measured tire axial force. Looking at the load Fz shown in FIG. 5C, although a place where a rise of each force occurs at a slightly earlier timing than the measured tire axial force can be seen, the estimated tire force F can obtain a magnitude of the force roughly equivalent to the measured tire axial force.

Figure 6B:
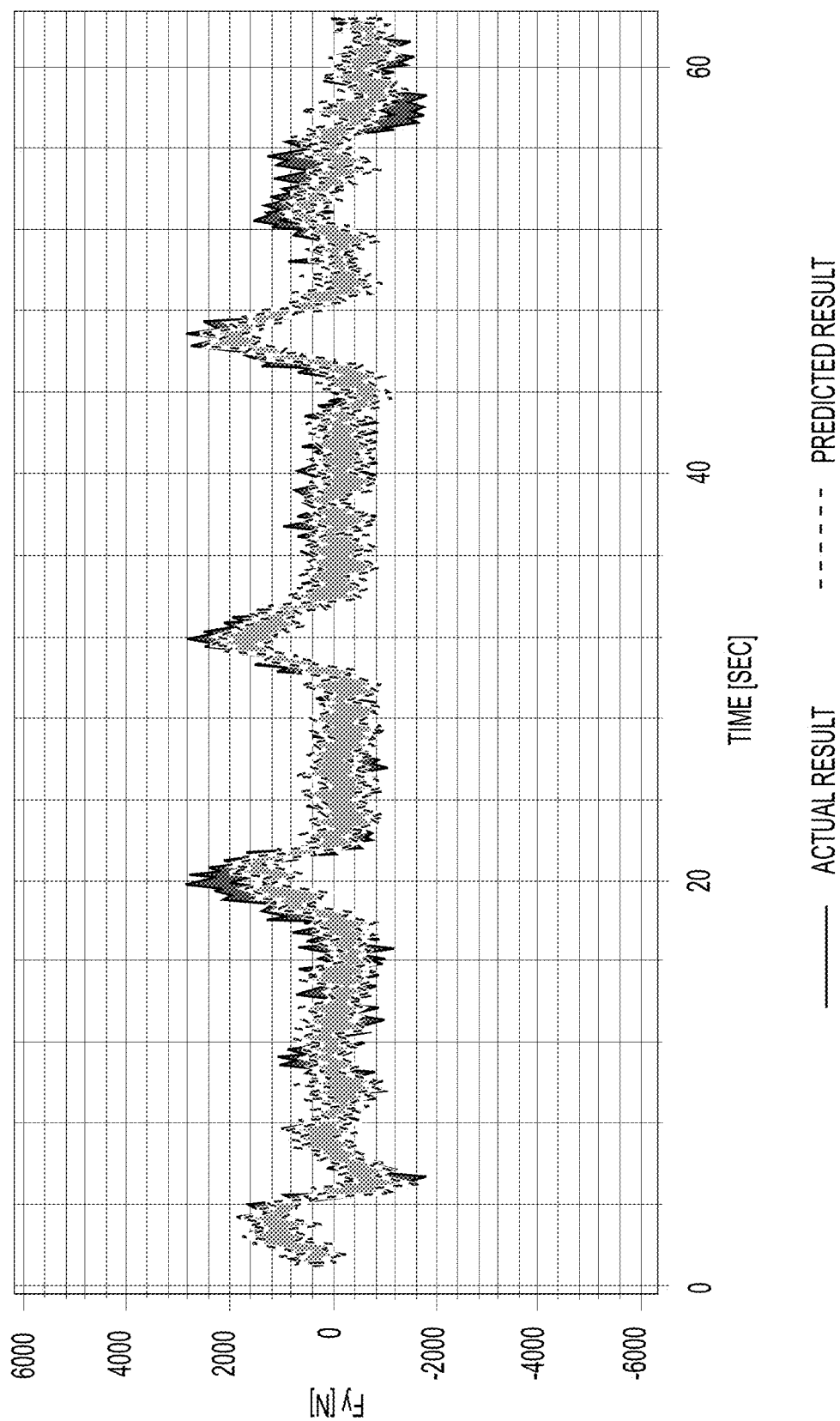
Figure 6C:
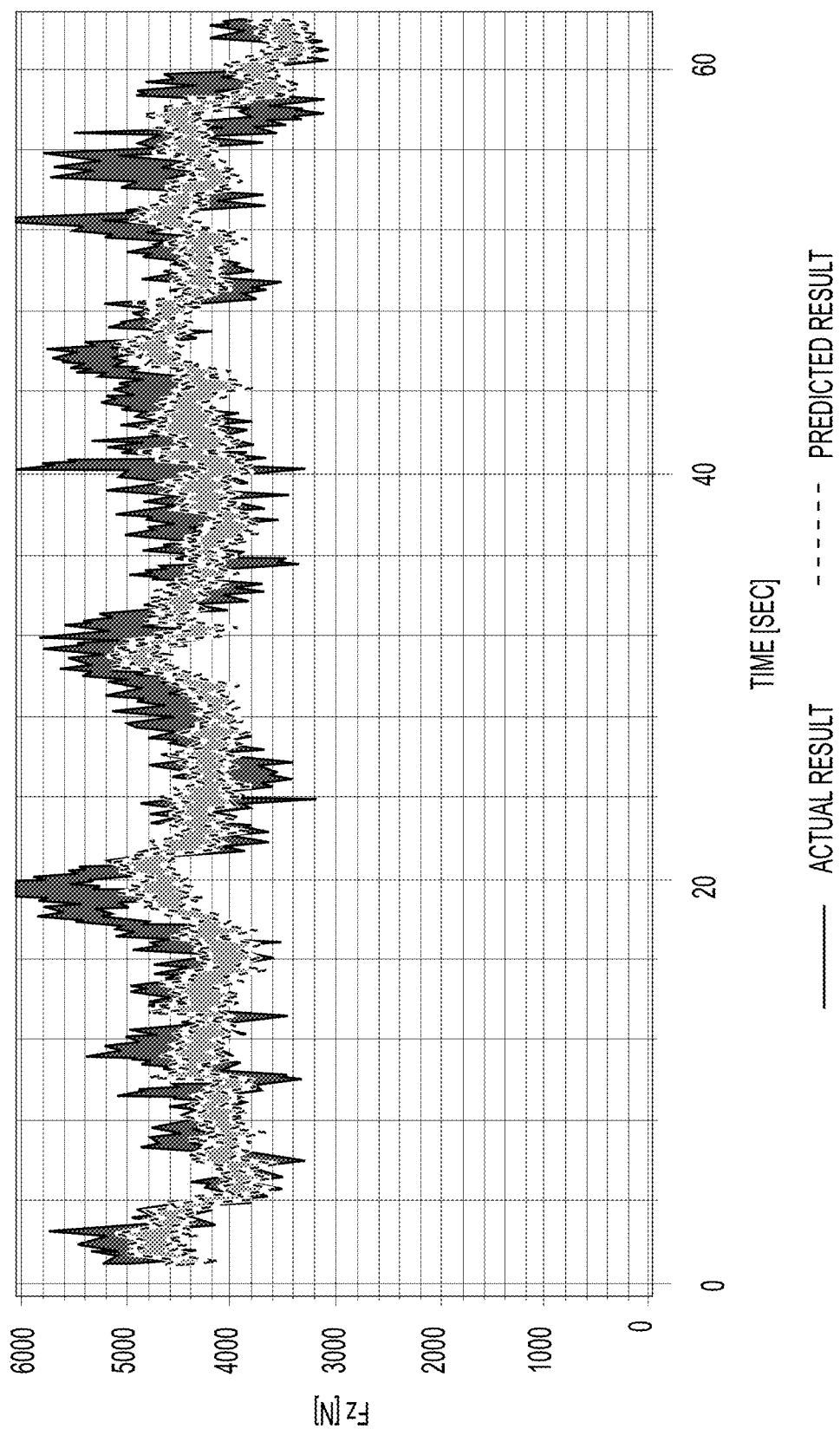

FIGS. 6A to 6C are graphs each showing estimated tire force F and measured tire axial force when the acceleration sensor 20 is disposed on the tread 11c. FIG. 6A is a graph showing longitudinal force Fx, FIG. 6B is a graph showing lateral force Fy, and FIG. 6C is a graph showing a load Fz. In FIGS. 6A to 6C, a horizontal axis represents time, and a vertical axis represents force. In this example in which the acceleration sensor 20 is disposed on the tread 11c, a sampling frequency is 200 Hz. In FIGS. 6A to 6C, "actual result" represents actual tire axial force (teacher data), and "predicted value" represents estimated tire force.

For any of the longitudinal force Fx shown in FIG. 6A, the lateral force Fy shown in FIG. 6B, and the load Fz shown in FIG. 6C, the estimated tire force F can obtain a rise of each force at almost the same timing as the measured tire axial force. In addition, for any of the longitudinal force Fx, the lateral force Fy, and the load Fz, a result in which a magnitude of the force is in good agreement with the measured tire axial force is obtained.

By updating the arithmetic model using the acceleration measured by the acceleration sensor 20 disposed on the tire 10, the arithmetic model generation system 100 can generate an arithmetic model for accurately estimating the tire force F. The arithmetic model generation system 100 can measure the tire axial force acting on the tire 10 and use it as teacher data in order to update the arithmetic model.

By providing the acceleration sensor 20 on the rim 15c of the tire 10, the arithmetic model generation system 100 can suppress weight imbalance of the tire 10 and set the sampling frequency of the acceleration data low compared to a case where the acceleration sensor 20 is provided on the tire body 11. Further, it is easier to dispose the acceleration sensor 20 on the rim 15c of the tire 10 than on the tire body 11.

In the examples shown in FIGS. 5A to 5C and FIGS. 6A to 6C, the tire force F in the triaxial direction is estimated. Alternatively, the arithmetic model generation system 100 may use an arithmetic model for estimating tire force for any one axis or any combination of two axes. For example, the arithmetic model can take the form of acceleration in the radial direction of the tire 10 as an input and the load Fz as an output, or the form of biaxial acceleration in the radial direction and the axial direction of the tire 10 as inputs and the lateral force Fy and the load Fz as outputs.

The tire force F estimated by the arithmetic model generation system 100 can be used to estimate a friction coefficient between road surfaces. Further, it can be used as data used for deriving side slip, braking distance, and the like in vehicle control, and data used for vehicle speed control in automatic driving, etc.

Next, features of the arithmetic model generation system 100 according to the embodiment will be described.

The arithmetic model generation system 100 according to the embodiment includes the sensor information acquisition unit 31, the tire force calculator 32, and the arithmetic model update unit 33. The sensor information acquisition unit 31 as an information acquisition unit acquires the acceleration of the tire 10 measured by the acceleration sensor 20. The tire force calculator 32 includes the arithmetic model 32b for calculating the tire force F based on the acceleration, and calculates the tire force F using the arithmetic model 32b by inputting the acceleration acquired by the sensor information acquisition unit 31. The arithmetic model update unit 33 compares tire axial force measured by the tire 10 and the tire force F calculated by the tire force calculator 32, and updates the arithmetic model. Thereby, the arithmetic model generation system 100 can generate an arithmetic model that accurately estimates the tire force F by updating the arithmetic model using the tire acceleration measured by the acceleration sensor 20 disposed on the tire 10.

Further, the acceleration sensor 20 for measuring the acceleration of the tire 10 is provided, and the acceleration sensor 20 is disposed on at least one of the rim 15c of the wheel 15 and the tire body 11. The arithmetic model generation system 100 can suppress weight imbalance of the tire 10 by disposing the acceleration sensor 20 on the rim 15c. In addition, the arithmetic model generation system 100 can improve estimation accuracy of the tire force F by disposing the acceleration sensor 20 on the tire body 11.

Further, the acceleration sensor 20 measures the acceleration in the radial direction of the tire 10, and the tire force calculator 32 calculates the tire force (load Fz) in the vertical direction. Thus, the arithmetic model generation system 100 can be used for estimating the tire force F in the uniaxial direction.

Further, the acceleration sensor 20 measures the acceleration in the radial direction, the axial direction, and the longitudinal direction of the tire 10, and the tire force calculator 32 calculates the tire force F (Fx, Fy, and Fz) in the vertical direction, the lateral direction, and the longitudinal direction. Thereby, the arithmetic model generation system 100 can be used for estimating the triaxial components of the tire force F.

In addition, the tire force calculator 32 includes the preprocessor 32a that extracts the acceleration in the road surface contact state of the tire 10 based on the measurement result of the acceleration sensor 20. Thereby, the arithmetic model generation system 100 can suppress increases in a data amount and a calculation amount in estimating the tire force F.

In addition, measuring instruments (the pressure sensor 21 and the temperature sensor 22) that measure at least one of the air pressure and the temperature of the tire 10 are provided, and the arithmetic model 32b uses the measurement results obtained by the measuring instruments for calculation of the tire force. Thereby, the arithmetic model generation system 100 can further improve estimation accuracy of the tire force F by inputting each information of the acceleration, the air pressure, and the temperature.

The arithmetic model generation method includes an information acquisition step, a tire force calculation step, and an arithmetic model update step. In the information acquisition step, the acceleration of the tire 10 measured by the acceleration sensor 20 provided in the tire 10 having the wheel 15 is acquired. In the tire force calculation step, based on the arithmetic model 32b that calculates the tire force F based on the acceleration, the tire force F is calculated by the arithmetic model 32b by inputting the acceleration acquired in the information acquisition step. In the arithmetic model update step, the tire axial force measured by the tire 10 and the tire force F calculated in the tire force calculation step are compared, and the arithmetic model is updated. Thereby, the arithmetic model generation method can generate an arithmetic model for accurately estimating the tire force F by updating the arithmetic model using the acceleration measured by the acceleration sensor 20 disposed on the tire 10.

Description has been given above based on the embodiments of the present invention. These embodiments are examples, so that those skilled in the art will understand that various modifications and changes are possible within the scope of the claims of the present invention, and that such modifications and changes are also within the scope of the claims of the present invention. Accordingly, the description and drawings herein are to be regarded as illustrative rather than restrictive.

What is claimed is:

1. An arithmetic model generation system comprising:
an acceleration sensor mounted on at least one of a rim of a wheel of a tire and a tire body, the acceleration sensor measuring acceleration in a vertical direction, a lateral direction and a longitudinal direction of the tire;
an information acquisition unit structured to acquire time-series data of acceleration including a road surface contact state of the tire measured by the acceleration sensor;
a tire force calculator including a preprocessor and an arithmetic model structured to calculate tire force in the vertical direction, the lateral direction and the longitudinal direction of the tire based on the acceleration of the tire, and the tire force calculator structured to calculate the tire force using the preprocessor and the arithmetic model by inputting the acceleration acquired by the information acquisition unit;
the preprocessor structured to process resampling and filtering the time-series data of acceleration acquired by the information acquisition unit, obtain a period in the road surface contact state in the acceleration data and extract the time-series data of acceleration including at least in the period in the road surface contact state by window processing;
the arithmetic model structured to calculate the tire force by inputting the time-series data of acceleration extracted by the preprocessor; and
an arithmetic model update unit structured to compare tire axial force measured by the tire and the tire force calculated by the tire force calculator and update the arithmetic model.

2. The arithmetic model generation system according to claim 1, further comprising measuring instruments structured to measure at least one of tire pressure and temperature,
wherein the arithmetic model uses measurement results obtained by the measuring instruments for calculation of the tire force.

3. An arithmetic model generation method comprising:
an acceleration sensor measuring step of measuring acceleration in a vertical direction, a lateral direction and a longitudinal direction of the tire, the acceleration sensor mounted on at least one of a rim of a wheel of a tire and a tire body, an information acquisition step of acquiring time-series data of acceleration including a road surface contact state of the tire measured by the acceleration sensor;

an information preprocess step of processing resampling and filtering the time-series data of acceleration acquired by the information acquisition step, obtaining a period in the road surface contact state in the acceleration data and extracting the time-series data of acceleration including at least in the period in the road surface contact state by window processing;

a tire force calculation step of calculating tire force, based on an arithmetic model structured to calculate the tire force in the vertical direction, the lateral direction and the longitudinal direction of the tire based on the acceleration of the tire, using the arithmetic model by inputting the time-series data of acceleration extracted by the information preprocess step; and an arithmetic model update step of comparing tire axial force measured by the tire and the tire force calculated in the tire force calculation step and updating the arithmetic model.

* * * * *